United States Patent
Öhman et al.

(10) Patent No.: US 8,348,049 B2
(45) Date of Patent: Jan. 8, 2013

(54) CONVEYOR SYSTEM

(75) Inventors: Michael Öhman, Molndal (SE); Steve Cox, Västra Frölunda (SE)

(73) Assignee: FlexLink Components AB (SE)

( * ) Notice: Subject to any disclaimer, the term of this patent is extended or adjusted under 35 U.S.C. 154(b) by 419 days.

(21) Appl. No.: 12/308,260

(22) PCT Filed: Jun. 8, 2006

(86) PCT No.: PCT/SE2006/000667
§ 371 (c)(1),
(2), (4) Date: Jun. 18, 2010

(87) PCT Pub. No.: WO2007/142559
PCT Pub. Date: Dec. 13, 2007

(65) Prior Publication Data
US 2010/0243408 A1 Sep. 30, 2010

(51) Int. Cl.
*B65G 17/32* (2006.01)
(52) U.S. Cl. ........................ 198/801; 198/699
(58) Field of Classification Search .................. 198/801, 198/698, 699, 699.1, 853
See application file for complete search history.

(56) References Cited

U.S. PATENT DOCUMENTS

| | | | | |
|---|---|---|---|---|
| 657,261 A * | 9/1900 | Abraham | ...................... | 198/801 |
| 799,771 A * | 9/1905 | Abraham | ...................... | 198/801 |
| 3,294,217 A * | 12/1966 | Kay | ............................... | 198/801 |
| 3,825,106 A * | 7/1974 | Wickam et al. | ............... | 198/801 |
| 4,474,114 A | 10/1984 | Davidson | | |
| 5,141,128 A * | 8/1992 | Pippin | ........................... | 198/801 |
| 5,165,514 A * | 11/1992 | Faulkner | .................... | 198/699.1 |
| 6,554,129 B2 * | 4/2003 | Straight et al. | ............. | 198/699.1 |
| 6,840,368 B2 * | 1/2005 | Betti et al. | ..................... | 198/801 |
| 7,686,159 B2 * | 3/2010 | Elsner | ........................... | 198/853 |

FOREIGN PATENT DOCUMENTS

| | | |
|---|---|---|
| GB | 1 427 506 A | 3/1976 |
| JP | 59-124629 | 7/1984 |

* cited by examiner

*Primary Examiner* — James R Bidwell
(74) *Attorney, Agent, or Firm* — Lerner, David, Littenberg, Krumholz & Mentlik, LLP

(57) ABSTRACT

A conveyor system for transporting cylindrical objects is disclosed including an endless conveyor arranged in a transport path, a drive for feeding the endless conveyor, guide rails for restricting lateral movement of cylindrical objects transported on the endless conveyor, an elevation transport section adapted to transport the cylindrical objects from a first height to a second height and including the endless conveyor having a base surface extending along the transport path, the endless conveyor including vertical protrusions extending outwardly from the base surface of the endless conveyor and including a front wall with an inclined portion sloping towards the base surface, such that a cylindrical object transported on the elevation transport section can rest on the inclined portion under a contact force directed towards the base surface by gravity.

8 Claims, 18 Drawing Sheets

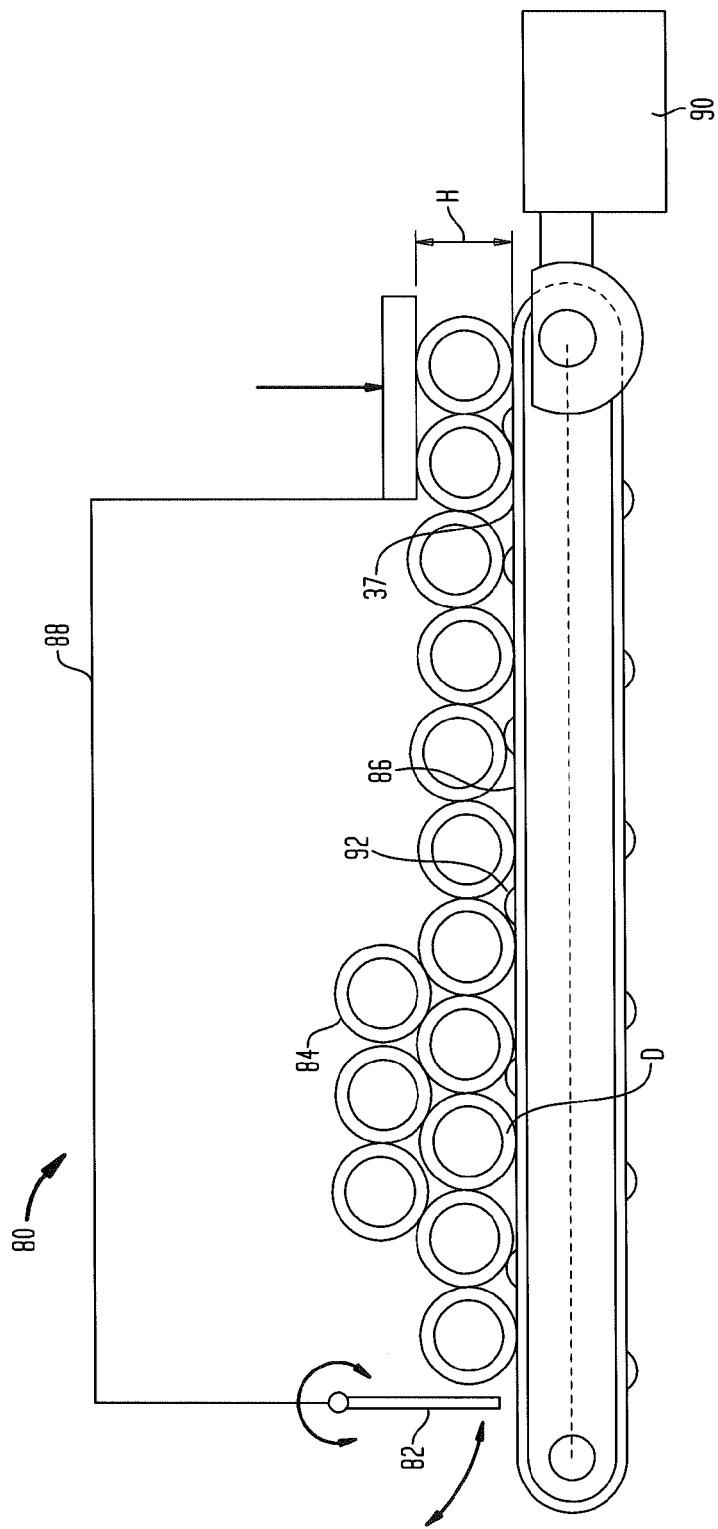

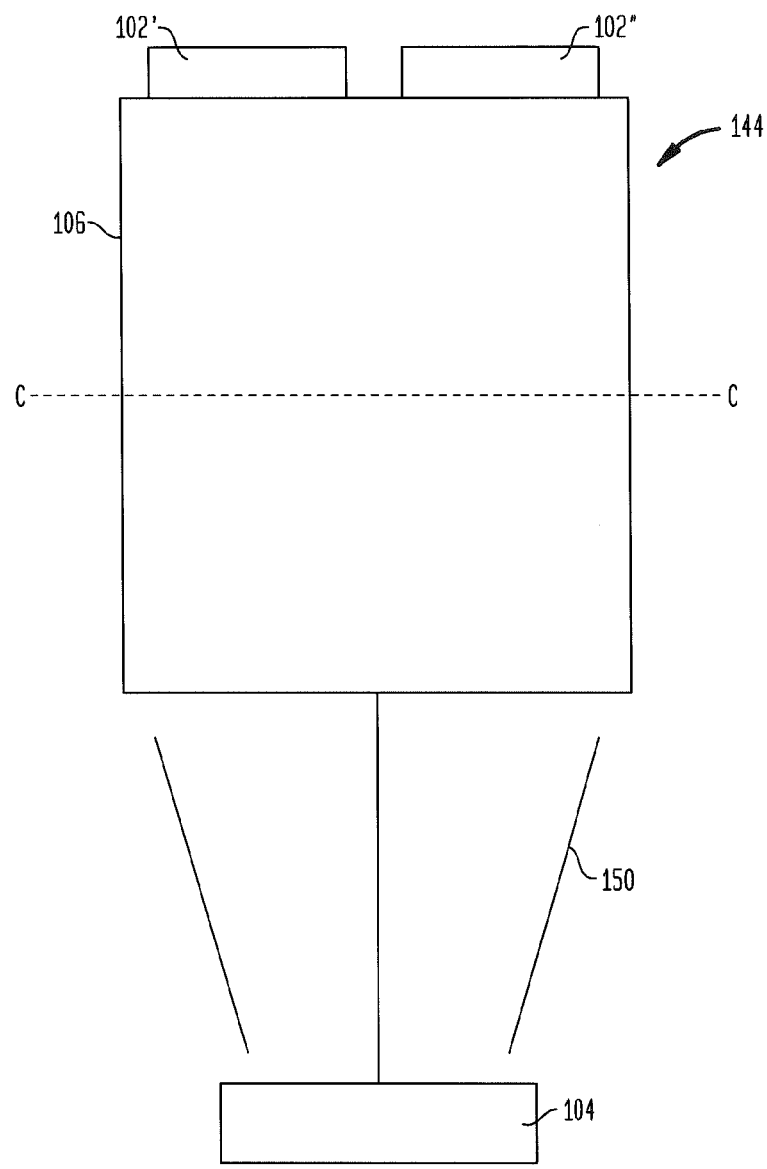

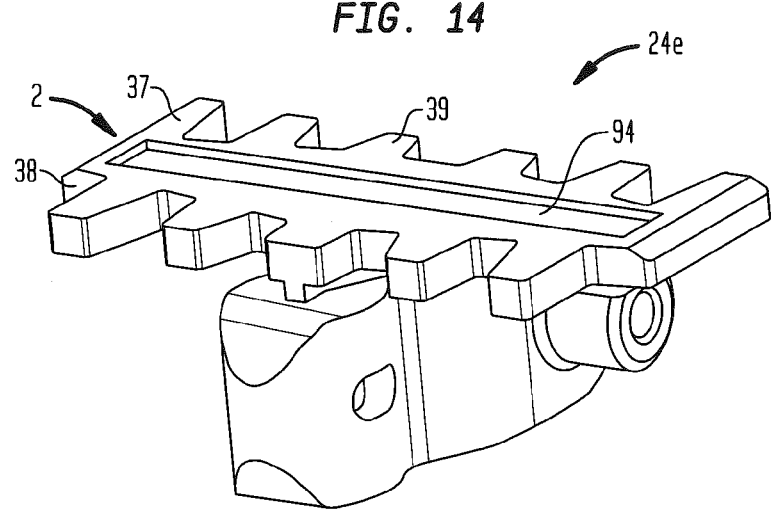
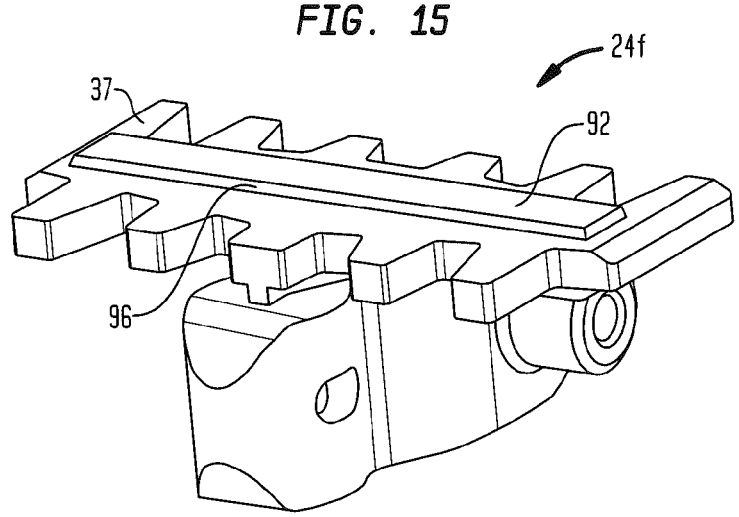

CONVEYOR SYSTEM

TECHNICAL FIELD

The present invention relates to a conveyor system according to the preamble of claim 1. Generally the invention relates to a conveyor system arranged for transportation of cylindrical objects. In particular the invention relates to a conveyor system for actively transporting cylindrical objects, such as roller or ball bearings, having a relatively small length extension in relation to the diameter of the cylindrical object. The relation between the length extension and the diameter generally lies within the interval ⅓—1/10.

BACKGROUND ART

In known conveyor systems for cylindrical objects, the cylindrical objects are generally transported lying down with one of the end faces of the cylindrical object facing a base surface of the conveyor. In known conveyor systems transportation in the vertical direction is performed in the same manner. An example of such a prior art vertical conveyer is shown in FIG. 1. Since the cylindrical object 1 does not adhere to a base surface 2 of the conveyor 3, the base surface 2 has been provided with carrier notches 4 allowing a lower edge 5 of the cylindrical object 1 to be carried by conveyor 3. In order to prevent the cylindrical object 1 to fall out from the conveyor the conveyor is normally arranged in a chute 6 having a wall 7 facing the base surface 2. The cylindrical object 1 will be transported in a slightly inclined manner having an upper portion 8 inclining against the chute wall 7. Such transportation may lead to damage and wear on the transported articles. Other prior art conveying arrangements are known where transportation of cylindrical objects are performed with the cylindrical object standing on the envelope surface. However in these arrangements the cylindrical objects will passively roll along rails. Without active transportation, the velocity of the conveyed objects can not be guaranteed. Furthermore, the position of the objects can not be kept under control. For these reasons active transportation of the objects is advantageous over passive conveying. With active conveying is intended that the cylindrical object is transported by the movement of a conveyor, in particular a continuous belt or chain. The conveyor system is intended primarily for the use of transportation of relatively dense products of plastic or metal, which easily would roll on passive rails. The transportation of the dense cylindrical products takes place with products arranged in a single layer, preferably with the object positioned at regular intervals which facilitates individual treatment of each cylindrical object at working stations that may be arranged along the transportation path.

Conveyor systems for cylindrical objects such as roller or ball bearings are frequently used in manufacturing lines where the cylindrical object is fed to a machine which may use the cylindrical object in an assembly process or may subject the cylindrical object to machining or other treatment. Since in known prior art conveying systems the cylindrical object is transported with the one of the end faces lying down on the base surface of the conveyor and machining and assembly frequently takes place with the cylindrical object in standing position, that is when the cylindrical object has its symmetrical axis in the horizontal plane, the cylindrical object must be subjected to a turning motion from the position where the symmetry axis is vertical to a position where the symmetry axis is horizontal before introduction into the machine for assembly, machining or other treatment. In addition to the turning motion a linear motion may also required in order to transport the cylindrical object from the conveyor into the machine. In order to turn a cylindrical object, and possibly also subject the cylindrical object to a linear translation, a more complex actuator is required in comparison to the case where only linear translation or possibly no movement at all is required. Furthermore it is desirable to eliminate unnecessary movements of transported objects since manufacturing processes then may be more efficient due to reduced time consumption in the conveyor system.

DISCLOSURE OF INVENTION

It is an object of the invention to provide a conveyor system for cylindrical objects, which mitigates the above mentioned problems. This object is achieved by a conveyor system according to the characterising portion of claim 1. In a conveyor system according to the invention the conveyer system is adapted to admit transportation of said cylindrical object vertically positioned in relation to the endless conveyor such that a symmetry axis of the cylindrical object extends in parallel with a width direction of the conveyor, that is the cylindrical object is transported with its cylindrical envelope surface resting on a base surface of the conveyor in stead of positioning the cylindrical object with one of the end faces lying down on the base surface of the conveyor. With base surface is intended an essentially flat surface of the conveyor extending in the transport direction of the conveyor.

Since the invention in particular elates to a conveyor system for transporting cylindrical objects such as roller or ball bearings having a relatively small length extension in relation to the diameter of the cylindrical object, it is desirable to arrange guide rails to give support to respective opposite end faces of said cylindrical object being defined by a cylindrical envelope surface and two opposite end faces. The relation between the length extension and the diameter generally lies within the interval ⅓—1/10. In particular when it concerns roller or ball bearings, the variation in diameter, both in relative terms and actual terms, is greater than the variation of the length extension. Since the variation in the width direction is of a smaller magnitude, the magnitude of necessary adjustments of guide rails is smaller, and some times unnecessary. This will lead to reduced time consumption when adapting a conveyor system to a new product having different dimensions in when compared with a prior art system having the cylindrical objects positioned in horizontal position, that is with the symmetry axis vertical to a base surface of the conveyor.

In a first embodiment of the invention the conveyor system includes an elevation transport section, which is adapted to transport a cylindrical object from a first height level to a second height level, which elevation transport section includes an endless conveyer having a base surface extending along the transport path. In this embodiment the endless conveyor included in the elevation transport section is provided with a set of vertical protrusions arranged on the upper surface of the endless conveyer, which vertical protrusions includes an inclined portion sloping toward said base surface such that a cylindrical object transported on said elevation transport section will rest on said inclined portion under a contact force which by gravity is directed toward said base surface. This construction allows for a safe and stable transportation of the cylindrical object which is resting on the vertical protrusion with its respective end faces directed toward guide rails arranged on opposite sides of the conveyor. Since the cylindrical object is resting on the vertical protrusion rather than being supported on part of the lower edge as in the prior art vertical conveyer shown in FIG. 1, it may be possible to arrange the elevation transport section without guide rails.

In a preferred embodiment, the vertical protrusions include an upper and a lower inclined portion, where a cylindrical object transported on said elevation transport section will rest on said upper portion when transported in an upward direction and will rest on said lower portion when transported in a downward direction. Advantageously, the cylindrical object may shift its position from an upper inclined portion on a first vertical protrusion to the lower inclined portion on a second neighbouring vertical protrusion when the cylindrical object passes a crest in an elevation transport section. After having passed the crest the cylindrical object is allowed to roll under gravity forces from the upper inclined portion toward the next coming vertical protrusion to be caught by its lower inclined portion, which is positioned above the upper inclined portion of the same vertical protrusion when the vertical protrusion is moving in the downward direction. In the region of the crest it is, due to this partly uncontrolled movement of the cylindrical object which performs a relative movement in relation to the conveyor, advantageous to arrange guide rails limiting the freedom of movement of the cylindrical object in the lateral direction, that is in the width direction of the conveyor.

The elevation transport section may be arranged in an inclined manner in relation to the vertical plane for upward or downward movement. It is generally not desirable to allow conveying along an elevation transport section having an inclination exceeding 90° with respect to the horizontal plane. As shown in FIG. 2, the elevation transport section has a first side A with an inclination of less than 90° and a second side B having an inclination exceeding 90°. Conveying on the first side A is safe for small or moderate angles a of the upper inclined portion while transportation on side B is only safe for larger angles β of the lower inclined portion, that is the lower inclined portion may be arranged with a larger angle β such that when the protrusions moves in the downward direction, the then upper portion of the protrusion is inclined downwardly with respect to a horizontal plane in the direction toward the base surface 18. For this purpose, the vertical protrusions may be asymmetrically shaped with respect to a plane which is vertical with respect to the base surface of the conveyor and which extends in the width direction of the conveyor that is a plane which is perpendicular to the conveying direction.

In the event the elevation transport section is intended for conveying cylindrical objects both in the upwards and downwards direction, it may be possible to arrange, in particular in the event the conveyor is vertically arranged, the vertical protrusions symmetrical with respect to a plane vertical to the conveying direction.

In the event it is intended to release the transported cylindrical objects after the objects has passed an upper peak, such as after level L2 in FIG. 2, it may be preferred to arrange the vertical protrusions asymmetrically such that when the protrusions moves in the downward direction, the then upper portion of the protrusion formed by a rear wall of the protrusion is inclined downwardly with respect to a horizontal plane in the direction from the base surface. Cylindrical objects that will be, after having passed an upper peak, transferred from a front wall of a protrusion, which front wall is facing the transport direction of the conveyor and corresponds to an upper portion of a protrusion arranged on a conveyor part running in an upwards direction, to a rear wall of a nextcoming protrusion, which rear wall is facing opposite to the transport direction and corresponds to a lower portion of the protrusions running in the upwards direction or an upper portion of the protrusions running in the downward direction. If the rear wall of the protrusion is inclined downwardly with respect to a horizontal plane in the direction from the base surface, a cylindrical object which is placed on the protrusion will be released from the conveyor.

The vertical protrusion which includes an upper and a lower inclined portion formed by a front and a rear wall respectively thus allows for transportation of a cylindrical object in both the upward and downward direction. The cylindrical object transported on said elevation transport section will rest on said upper portion when transported in an upward direction and will rest on said lower portion when transported in a downward direction. In order to admit transportation in the upward direction the front wall must be, in mounted shape, inclined with respect to a horizontal plane toward the base surface. In order to admit transportation in the downward direction the rear Wall must be, in mounted shape, inclined with respect to a horizontal plane toward the base surface.

In a second embodiment of the invention, the conveyor system includes a storage section, which storage section includes a gate, which in closed state, prevents or limits release of transported cylindrical objects from said storage section, an endless conveyor and guide rails positioned on a respective side of said endless conveyor, which guide rails extend in the vertical direction to allow support for more than one layer of cylindrical objects positioned on top of each other on said endless conveyor. The cylindrical objects that are positioned on top of other conveyed cylindrical objects need the guide rails to not fall of the conveyer. This is particularly important for a conveyor system for transporting cylindrical objects such as roller or ball bearings having a relatively small length extension in relation to the diameter of the cylindrical object. It is desirable to arrange guide rails to give support to respective opposite end faces of said cylindrical object being defined by a cylindrical envelope surface and two opposite end faces. The relation between the length extension and the diameter generally lies within the interval ⅓—1/10. Such an object would inevitably fall if the guide rails can not support the object. For the purpose of giving adequate support, the guide rails are preferably constituted by flat walls extending in the height direction from the conveyor to a suitable height of two of more layers. Walls will be considered to be flat as long as they do not include notches, gaps projections or other uneven structures that may prevent the cylindrical objects from climbing on top of each other and/or to move in the transport direction. It is furthermore advantageous to arrange the walls such that the transported object may be observed through the wall, as for example by arranging the walls by a small structured net, by a plate having small perforations arranged thereon or by a translucent or transparent glass or plastic wall. When the gate opens, stored cylindrical objects will be released from the storage section.

In a preferred embodiment, the storage system comprises an endless conveyor which is provided with base surface having a set of humps or cut-outs arranged to transfer a momentum in an upwards direction to a cylindrical object positioned in the storage section when said hump or cut-out is passing said cylindrical object facilitating the forming of a plurality of layers of cylindrical object. The uneven surface of the base surface of the endless conveyor ensures that a distortion to the movement in the forward direction is generated, which distortion facilitates for allowing cylindrical objects to climb on top on other cylindrical objects when stored in the storage section.

In a third embodiment of the invention, the conveyor system includes a transfer section arranged to transfer a cylindrical object from a first part of said transport path to a second portion of said transport path, said transfer section is constituted by a disc rotatably arranged around a horizontal axis, said disc having a perimeter which defines at least one gap arranged to receive a cylindrical object being transported on said first part of the transport path when said gap is in a receiving position and arranged to deliver a cylindrical object to said second part of the transport path after the disc is rotated to a delivery position. The gap on the perimeter is preferably arranged to receive one cylindrical object at a time and to individually transfer the cylindrical object from an input conveyor under rotation of the disc from a receiving position to a delivery position.

Preferably, at the transfer section, the first part is arranged at a level which is above the level at which the second part is arranged, such that a lower edge portion of a gap under an introduction phase is inclined downwardly such that a cylindrical object may roll toward the centre of the disc and that a lower edge portion of a gap under a disengagement phase is inclined downwardly such that a cylindrical object may roll from the centre of the disc.

The conveyor system may include one or more elevation transport sections as have been described above; and/or one or more storage sections as have been described above; and/or one or more transfer sections as have been described above according to the desired layout of the transport system.

According to a fourth embodiment, the conveyor system includes, at least along a portion of the conveyor path, a plurality of parallel conveyer paths each being separated by guide rail portion, where said to guide rails are arranged to give support to respective opposite end faces of said cylindrical objects. Preferably, a converging module is arranged at the end of the plurality of parallel conveyor paths, which converging module reduces the number or parallel conveyor paths by allowing entry from at least two parallel paths to a single path.

A diverting module may preferably be arranged at the beginning of the plurality of parallel conveyor paths, which diverting module diverts a set of entry conveyor paths into said plurality of parallel conveyor paths which includes an increased number of parallel conveyer paths in relation to the number or paths included in the set of entry conveyor paths.

In the embodiments having a plurality of parallel conveyor paths arranged side by side, preferably two neighbouring parallel conveyor paths share a common guide rail. In a further preferred embodiment a common conveyer element forms a base surface for said plurality of parallel conveyer paths. In this embodiment, a chain link may be provided with a plurality of vertical protrusions positioned side by side with a space allowing guide rails to be introduced in these gaps for supporting objects to be transported by the vertical protrusions. Since it is not necessary or rather not possible to arrange vertical protrusions on all chain links due to the fact that a longer longitudinal separation between vertical protrusions is necessary, it may also be possible to only arrange a single vertical protrusion on a chain link and allowing different links to have different positions of the vertical protrusion in the width direction. For example a first link may have the vertical protrusion arranged on the left side, a second link may have the vertical protrusion centrally arranged and a third link may have the vertical protrusion arranged on the right side. By allowing only one vertical protrusion on each link and varying the position, it is possible to obtain a more uniform load on the links in a chain in comparison to if some of the links carry a plurality of vertical protrusions and hence a plurality of objects while other links do not carry any objects.

In a fifth embodiment, the parallel portions belong to an elevation transport section including an endless conveyor which is provided with a plurality of sets of vertical protrusions arranged on the upper surface of the endless conveyer. The vertical protrusions include an inclined portion sloping toward said base surface such that a cylindrical object transported on said elevation transport section will rest on said inclined portion under a contact force which by gravity is directed toward said base surface, wherein each parallel section includes its own set of vertical protrusions arranged on a base surface common to all parallel conveyer paths in said plurality of parallel conveyer paths.

In a sixth embodiment, the parallel portions belongs to a storage section including an endless conveyor which is provided with a base surface having a plurality of sets of humps or cut-outs arranged to transfer a momentum in an upwards direction to a cylindrical object positioned in the storage section when said hump or cut-out is passing said cylindrical object facilitating the forming of a plurality of layers of cylindrical objects. Each parallel section includes humps or cut-outs arranged on a base surface common to all parallel conveyer paths in said plurality of parallel conveyer paths.

BRIEF DESCRIPTION OF DRAWINGS

Embodiments of the invention will be described below with references to appended drawings where, FIG. 3 shows a storage section according to the invention, FIG. 4a-4f illustrate an embodiment where the transfer section forms part of a converging module, FIG. 14 shows a link member having a cut out, FIG. 15 shows a link member having a hump.

EMBODIMENTS OF THE INVENTION

Figure 1:
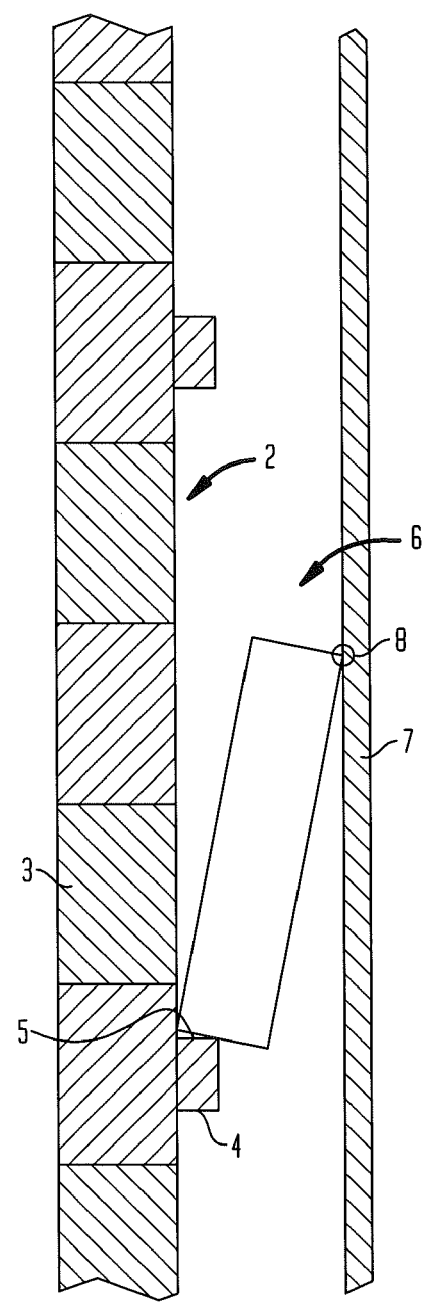
FIG. 1 shows a prior art chute for performing vertical transport of cylindrical objects.
Figure 2:
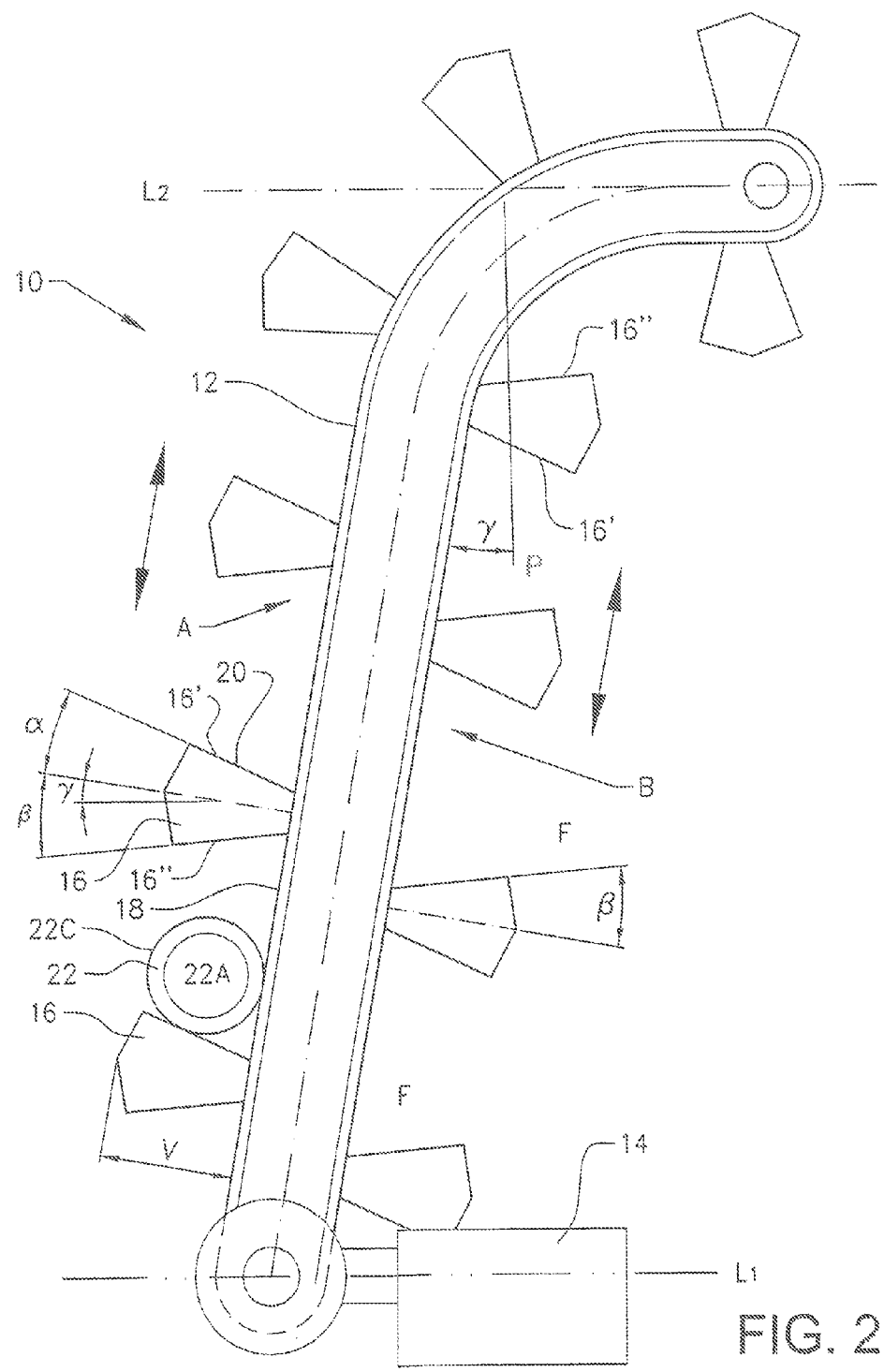
FIG. 2 shows an elevation transport section according to the invention.

In FIG. 2 an elevation transport section 10 forming part of a conveyor system for transporting cylindrical objects 22 is shown. The cylindrical object includes two opposite end faces 22A and an envelope surface 22C. The elevation transport section 10 is arranged to transport a cylindrical object from a first height level L1 to a second height level L2. In the embodiment shown in FIG. 2 the elevation transport section forms a transportation path which is inclined in relation to a vertical plane P at an angle γ. As shown in FIG. 2, the elevation transport section has a first side A with an inclination of less than 90° and a second side B having an inclination exceeding 90°. It is possible but not necessarily to use both sides of the elevation transport section for transportation of goods. One side of the elevation transport section may be used as a transport path while the other opposite side is used as a return path. The transport path may include portions which have an inclination of less than 90°, vertical portions as well as portions having an inclination of more than 90°.

In the event the conveyor path extends both in the upwards direction and downwards direction of the elevation transport section, protrusions 16 arranged on the endless conveyor will each include an upper inclined portion 16' as well as a lower inclined portion 16".

Conveying on the first side A is safe for small or moderate angles α of the upper inclined portion 16' while transportation on side B is only safe for larger angles β of the lower inclined portion 16". For this purpose, the vertical protrusions 16 may be asymmetrically shaped with respect to a plane which is vertical to the base surface 18 of the conveyor and which extends in the width direction of the conveyor that is a plane which is perpendicular to the conveying direction.

In the event the elevation transport section 10 is intended for conveying cylindrical objects 22 both in the upwards and downwards direction, it may be possible to arrange the vertical protrusions 16 symmetrically with respect to a plane vertical to the base surface 18 and the conveying direction. This is particularly preferred in the event the conveyor is vertically arranged.

In the event it is intended to release the transported cylindrical objects after the objects has passed an upper peak, such as after level L2 in FIG. 2, it may be preferred to arrange the vertical protrusions asymmetrically such that protrusions which moves in the downward direction have each an upper portion which is inclined downwardly with respect to a horizontal plane in the direction from the base surface 18. Cylindrical object will after having passed the upper peak be transferred from a front wall 16' of the protrusion, which front wall corresponds to the upper portion of the protrusions running in the upwards direction, to a rear wall 16" of a next coming protrusion, which rear wall corresponds to corresponds to an upper portion of the protrusions running in the downward direction. If the rear wall 16" of the protrusion is inclined downwardly with respect to a horizontal plane in the direction from the base surface 18, a cylindrical object which is placed on the protrusion will be released from the conveyor. On the other hand if the rear wall 16" of the protrusion is inclined upwardly with respect to a horizontal plane in the direction from the base surface 18, a cylindrical object which is placed on the protrusion will be kept on the conveyor.

The vertical protrusion which includes an upper and a lower inclined portion thus allows for transportation of a cylindrical object in both the upward and downward direction. The cylindrical object transported on said elevation transport section will rest on said upper portion when transported in an upward direction and will rest on said lower portion when transported in a downward direction.

The path shown in FIG. 2 is slightly curved at the top such that the inclination with respect to the horizontal plane is more narrow close to the top level L2. The path may even be horizontal or negatively inclined at the top. With this configuration it is ensured that the rear wall 16" will not catch a cylindrical object after having passed the top level of the conveyor. It is of course possible to arrange the conveyor extending along a straight line, which may be vertical or inclined.

Figure 2A:
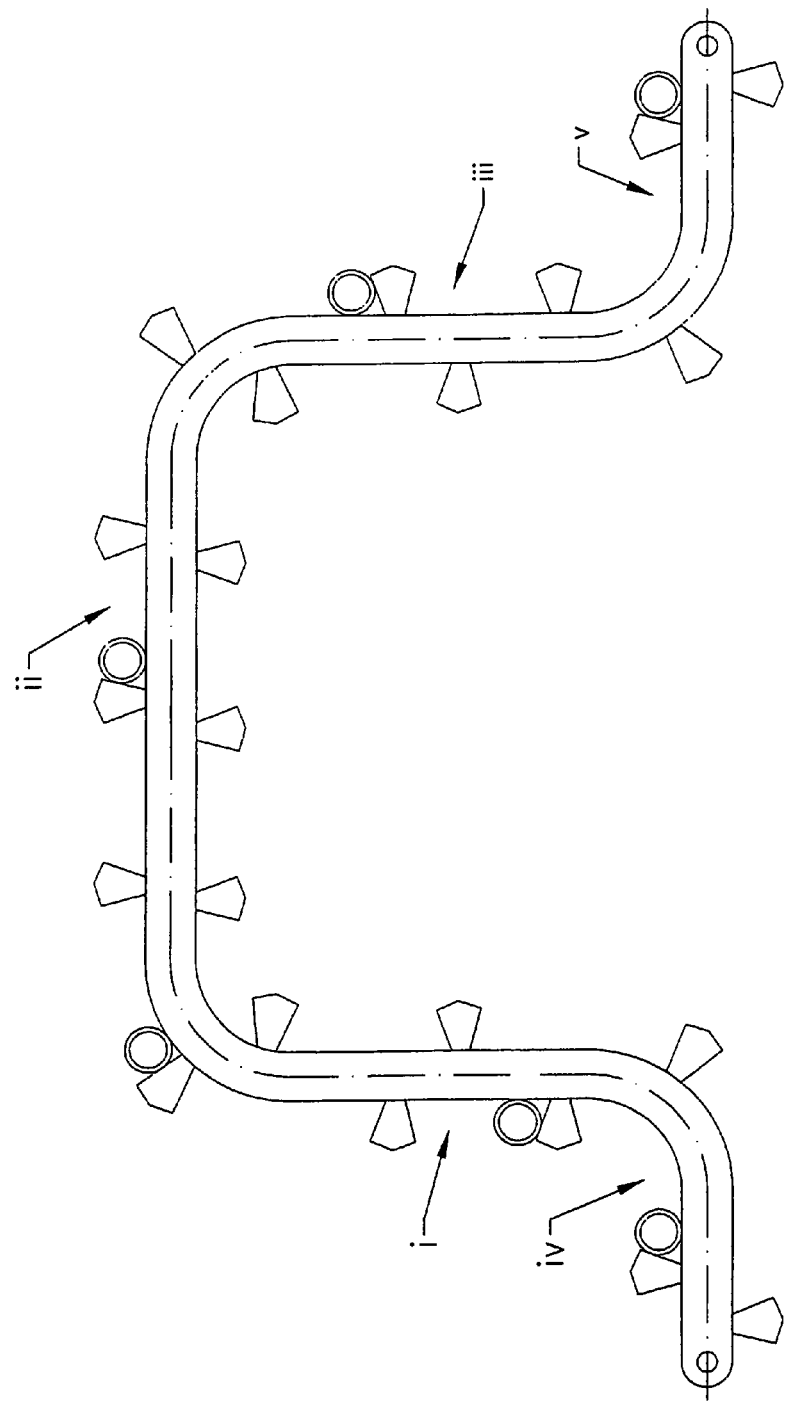
FIG. 2a shows a first alternative embodiment of possible conveyor path configurations.

In FIG. 2a an alternative embodiment of possible conveyor path configurations is shown. In FIG. 2a, the conveyor path includes a first vertical portion i running vertically upwards, the first vertical portion being connected to a first horizontal portion ii, which in turn is connected to a second vertical portion iii running in the downward direction. The conveyor path shown in FIG. 2a may be constituted by a single endless conveyor guided to run in the shown manner. The conveyor path may also include an incoming horizontal conveyor iv and an outgoing horizontal conveyor v. This configuration of conveyor paths may be useful when arranging passage openings allowing trucks, robots etc. to pass through the conveyor path.

The elevation transport section includes an endless conveyor 12. The endless conveyor may be formed by an endless belt or chain. Preferably the chain may be formed by an endless chain of the type described in U.S. Pat. No. 6,364,094. The chain may run in a conveyor tracks arranged on opposite sides of a supporting beam, such as for instance is shown in US2004238334. The conveyor conventionally includes a conveyor drive arrangement 14 feeding the chain.

The endless conveyor is provided with a set of vertical protrusions 16 arranged on a base surface 18 of the endless conveyer 12. The vertical protrusions 16 includes an inclined portion 20 sloping toward the base surface 18 such that a cylindrical object 22 transported on the elevation transport section 10 will rest on the inclined portion 20 under a contact force F which by gravity is directed toward said base surface 18. With base surface is intended the plane which follows the conveying path. The base surface 18 is essentially flat and extends in the transport direction of the conveyor when assembled. The base surface may be formed by a plurality of links of the type shown in FIGS. 5 and 6. Also other types of links may be contemplated.

Figure 5:
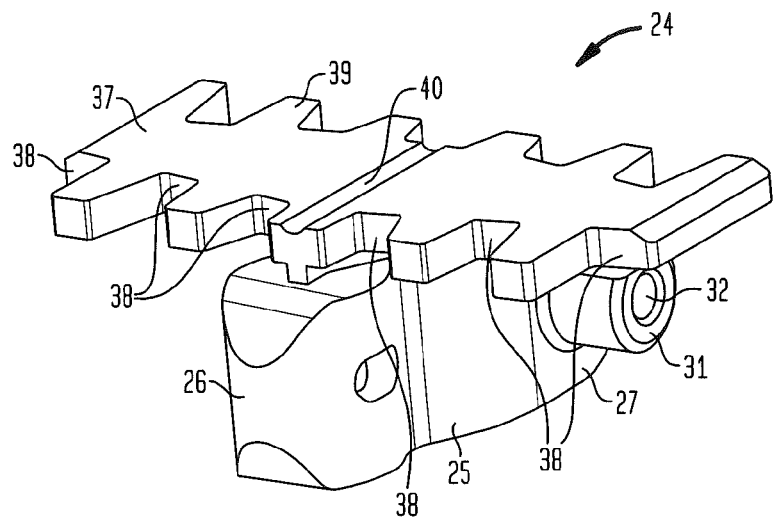
FIG. 5 shows a perspective side view of a link member that may be used to form the base surface of the endless conveyor.
Figure 6:
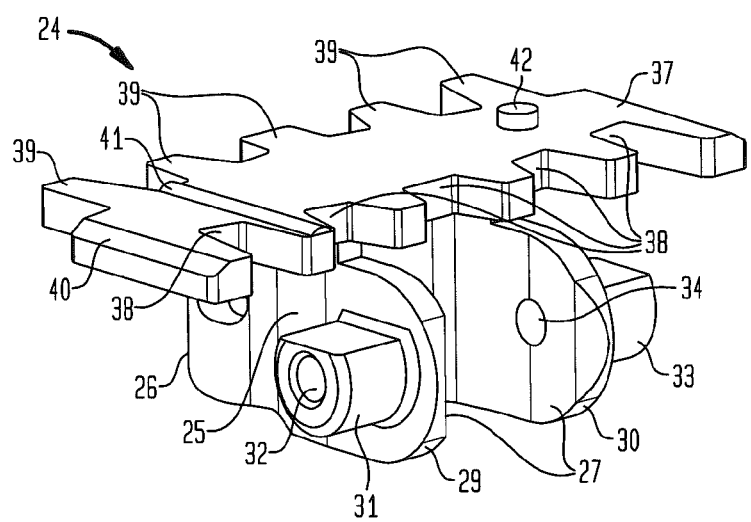
FIG. 6 shows another perspective side view of a link member according to FIG. 5.

In FIGS. 5 and 6, a link member 24 which can form a part of a conveyor chain link is shown. The link member has a lower portion 25 which has a first end 26 and a second end 27. The first end 25 has a substantially spherical bearing seat which is arranged to cooperate with a bearing element by partly embracing the bearing element. The second end 27 has a first leg 29 and a second leg 30 arranged at a certain distance from each other, the legs bifurcating out from the first end 25. The first leg 29 has a first horizontal protrusion 31 arranged in a plane essentially parallel with the base surface and extending substantially perpendicular to the travelling direction of the chain link conveyor and facing outwards from the first leg. The first and second horizontal protrusions are advantageously utilised as transport facilitating means, i.e. used as engagement means for cooperation with a driving wheel or the like, for example interacting with cog wheels of a conveyor drive unit. The first horizontal protrusion 31 has a first through hole 32 of a non-circular cross-section, preferably substantially triangular. The second horizontal protrusion 33 is arranged on the second leg 30 opposite to the first horizontal protrusion 31 and facing outwards from the second leg. The second horizontal protrusion 33 has a second through hole 34 substantially coaxial with the first through hole 32 of the first horizontal protrusion 31 and of the same cross-section. A vertical guidance rib 35 is arranged on the inside of each of the first and second legs 29 and 30 respectively. The second end 27 of the link member 24 further has a curved surface arranged to cooperate with the bearing element.

An upper side 37 of link member 24 is, for links not carrying a vertical protrusion of the type mentioned above, preferably shaped like a substantially flat base surface having a plurality of notches 38 and teeth 39 arranged adjacent to the first end 26 and the second end 27. The notches and the teeth are arranged to mesh with the corresponding notches and teeth of an adjacent chain link. As may be observed from the figure, the upper base surface 37 may have certain irregularities such as cut edge portions 40, small ridges 41 or notches 42 or irregularities of other types. The upper surface will be considered to be essentially flat as long as the magnitude of the irregularities are much smaller than the diameter of the cylindrical object to be transported. On the other hand, the vertical protrusions 16 forming the support for the cylindrical objects to be transported must have an extension vertically to the base surface which is of the same magnitude as the diameter of the cylindrical objects to be transported. The minimum vertical extension V must exceed half the diameter of the transported cylindrical object. Preferably the vertical extension is about the size of the diameter, that is from 80-150% of the diameter size.

Figure 7:
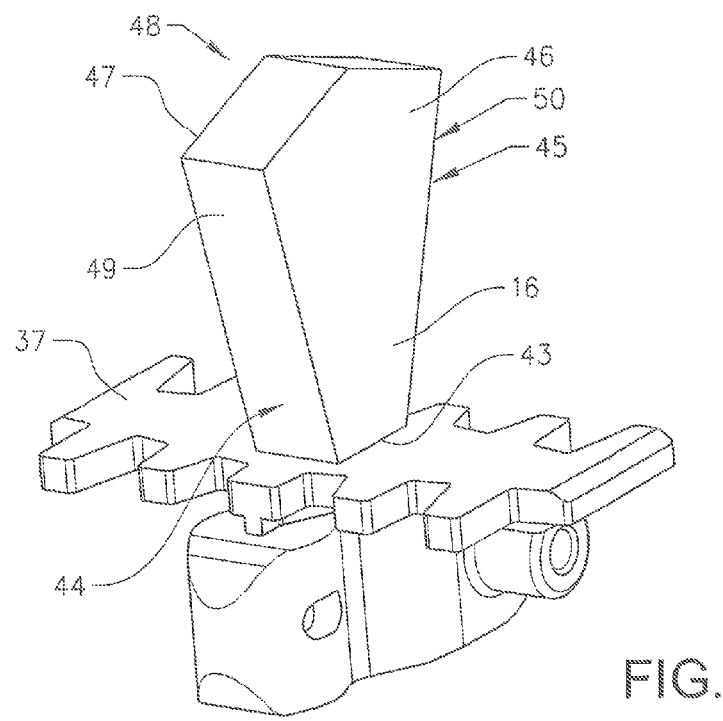
FIG. 7 shows a link member having a vertical protrusion for carrying a cylindrical object.
Figure 9:
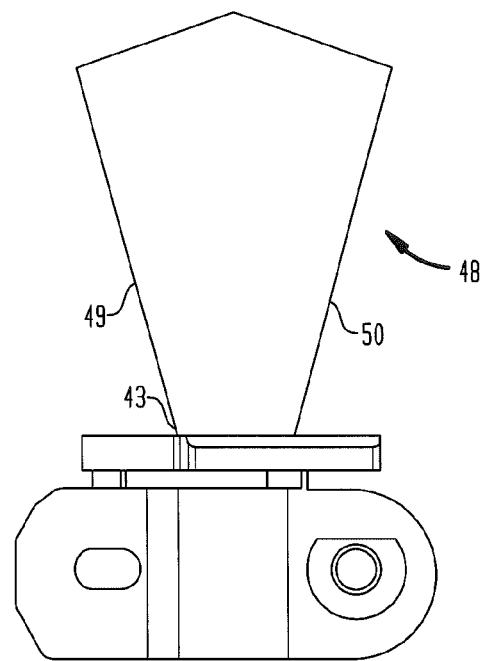
FIG. 9 shows a cross section through the vertical protrusion along the length axis of the conveyor.

In FIG. 7, a first embodiment of a link member 24 provided with a vertical protrusion 16 extending in the vertical direction out from the upper base surface 37 is shown. The vertical protrusion has a base 43 which is connected to the base surface 37, a front face 44, a back face 45, two side portions 46, 47 and a top end 48. The side portions 46, 47, which are arranged along the length direction of the conveyor path, are preferably essentially flat so as to run smoothly between guide rails arranged on opposite sides of the vertical protrusion. The guide rails in this and any other embodiment disclosed herein are adapted to support opposite end faces 22A of cylindrical objects 22. The front face 44 and back face 45 includes each an inclined portion 49, 50 sloping toward said base surface such that a cylindrical object transported on said elevation transport section will rest on said inclined portion 49, 50 under a contact force which is directed toward said base surface. Since it may be desirable to transport cylindrical objects having different diameters on the vertical protrusions, inclined portions 38 may extend all the way from the base 43 up till the top end 48. A cross section through the vertical protrusion along the length axis of the conveyor is shown in FIG. 9. It is shown that the front face and the back face forms inclined portions which tangents meet below the base 36. That is, the vertical protrusion has a cross section which increases in the length direction as the distance from the base 43 increases. An object resting against the front or back face will therefore under contact forces be directed toward the base surface. The vertical protrusion is thus preferably wedge-shaped having its wider base at the far end from the base 43. Preferably, the back and front faces are symmetrical with respect to a plane $P_{vertical}$ which is perpendicular to the transport direction. In the embodiment shown, the bending radius is continuously decreasing in the direction out from the base 43. Preferably, the vertical extension is about the size of the diameter that is from 80-150% of the diameter size. The inclination of the front of back faces may alternatively be constant over its vertical extension from the base toward the top end.

Figure 8:
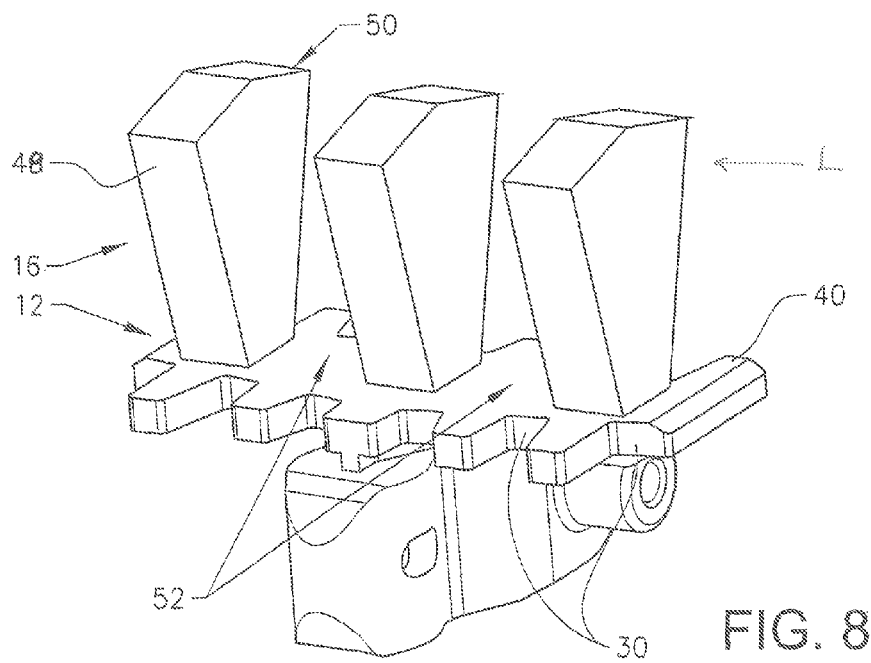
FIG. 8 shows another embodiment of a link member having a plurality of vertical protrusions according to the invention.

In FIG. 8, an embodiment of a link member having a plurality of vertical protrusions 16 is shown. The vertical protrusions are arranged in parallel with each other in the lateral direction L of the link member, that is in a direction perpendicular to the transport direction of the conveyor when assembled. A gap 52 is separating each vertical protrusion. When the elevation transport section is assembled including its endless conveyor, guide rails will be positioned such that the guide rails extend in between the gaps 52 for supporting goods transported on the vertical protrusions 16.

The vertical protrusion may advantageously be integrally shaped in one piece with the main body constituting the link member. In order to facilitate for loading and unloading of articles from an endless conveyer including links of the type mentioned above, a single link member will only include a single vertical protrusion in the length direction of the link, that is the extension along the transport direction of the conveyor when assembled. If a plurality of protrusions were arranged consecutively after each other, objects may be locked in between the spacing in the length direction. If however, the link member carries a plurality of vertical protrusion arranged in the width direction of the link member, as in the embodiment shown in FIG. 8, it is not necessary to arrange them in parallel with each other since it is possible to arrange them with a small separation along the length extension.

Figure 10:
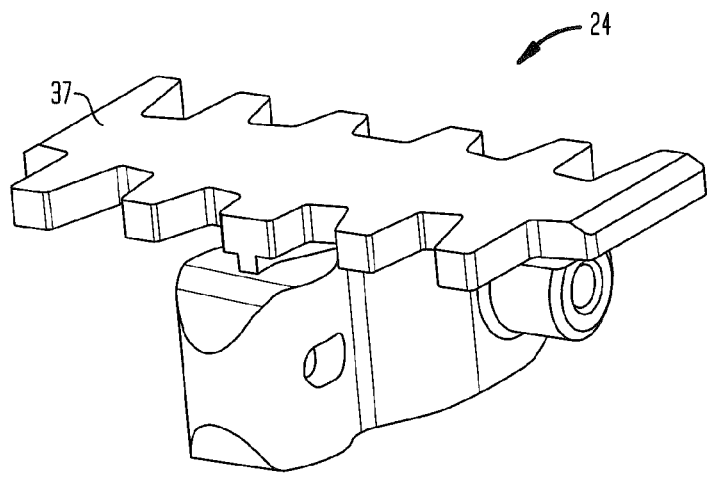
FIG. 10 shows a link member not carrying a vertical protrusion.

Preferably, an endless conveyor including link members with vertical protrusion of the type described above includes a set of link members having vertical protrusions separated by link members 24, as shown in FIG. 10, which do not carry vertical protrusions, but which instead preferably are provided with an essentially flat upper surface 37. Preferably, one or more link members not carrying a vertical protrusion separate each link member which carries a vertical protrusion. The endless conveyor thus includes at least two types of different link members, wherein one type includes vertical protrusions.

Figure 11:
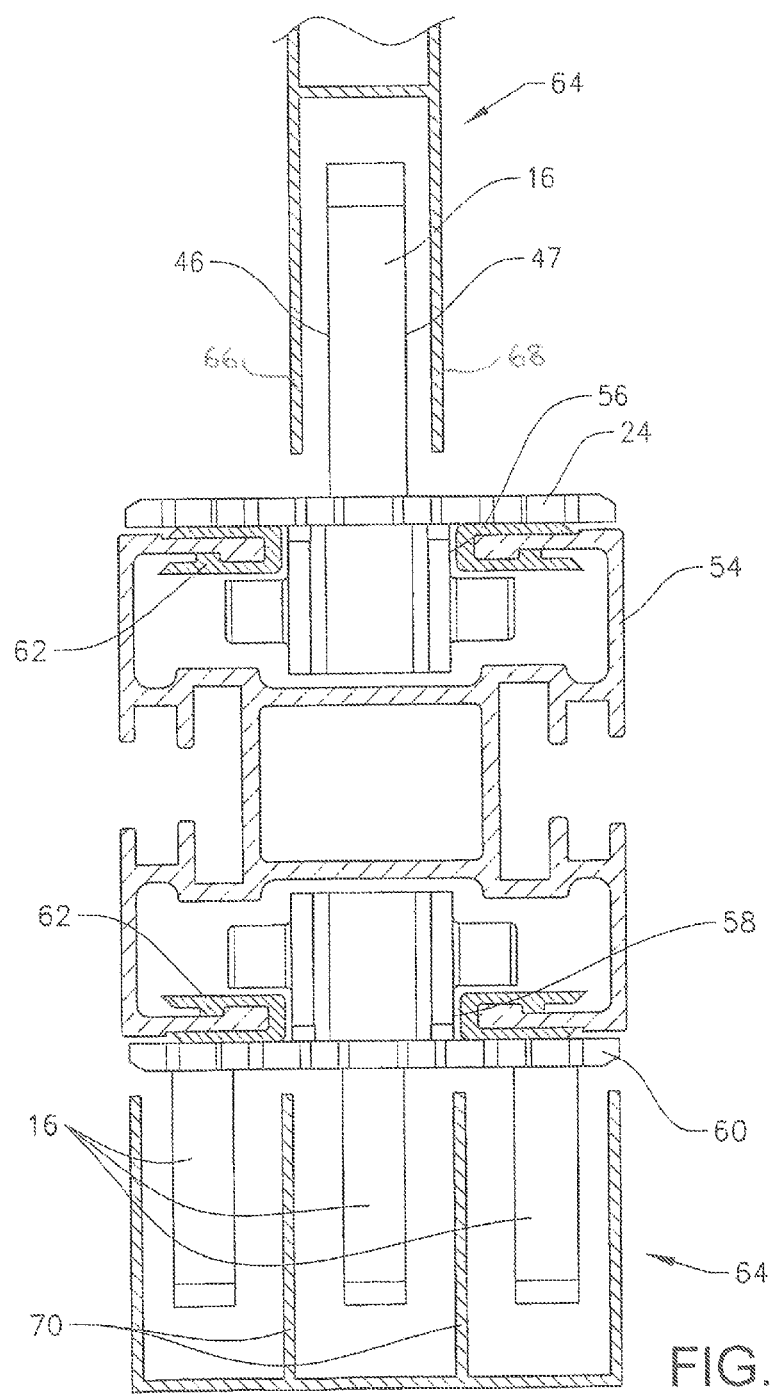
FIG. 11 shows a vertical cross section through a support beam carrying an endless conveyor provided with link members having vertical protrusions.
Figure 12:
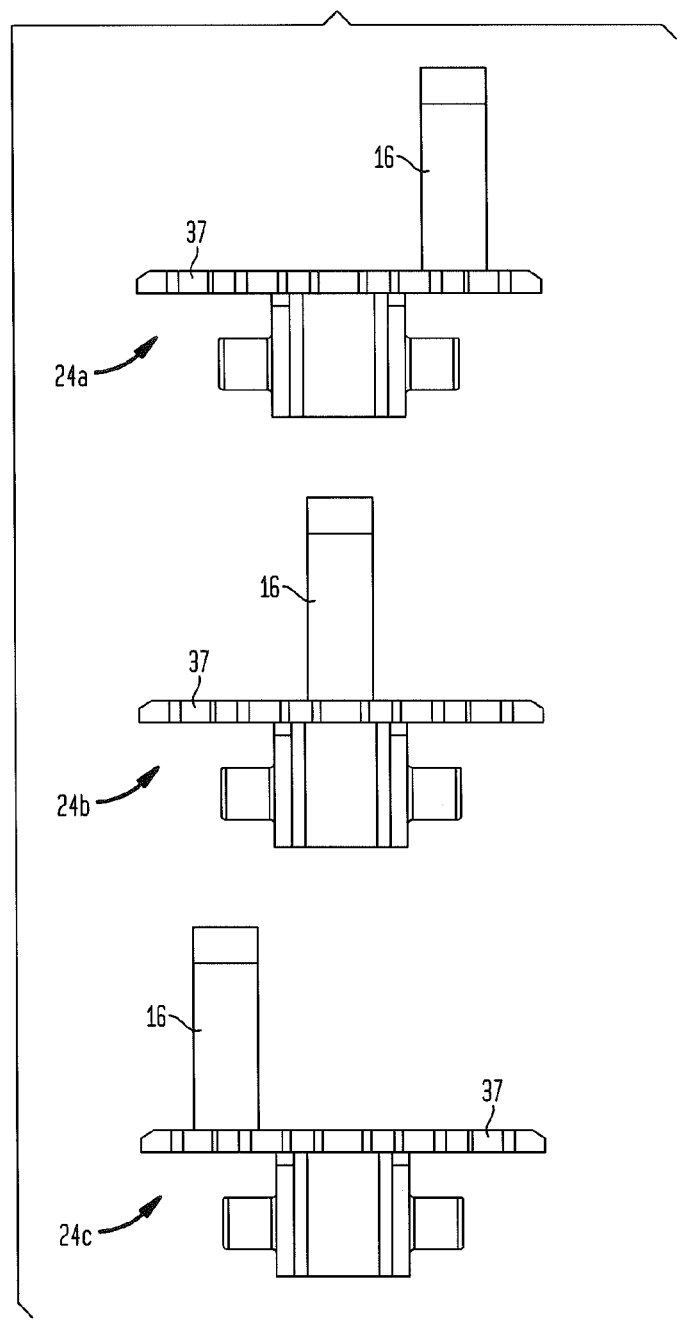
FIG. 12 shows cross sections through link members of different types.
Figure 13A:
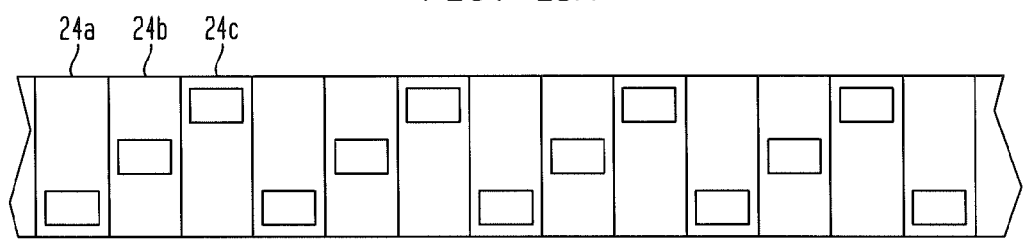
FIG. 13a shows an endless chain made of link members of the type shown in FIG. 12.
Figure 13B:
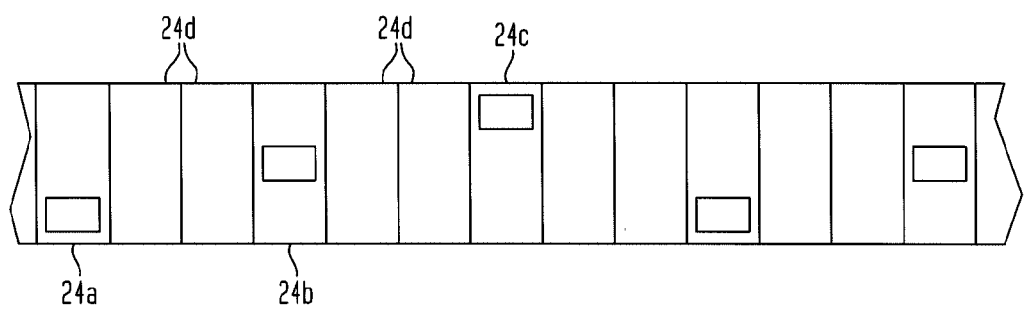
FIG. 13b shows an endless chain including link members of the type shown in FIG. 12 and link members without vertical protrusions.

In FIG. 11 a vertical cross section through a support beam 54 carrying an endless conveyor provided with link members having vertical protrusions is shown. The support beam forms a lower and upper conveyor track 56, 58 in which the endless conveyor 60 runs. The conveyor tracks 56, 58 may preferably be provided with slide rails 62 as is conventional in the art. On the upper half of FIG. 11, a link member 24 having a single vertical protrusion 16 is shown. On the lower half, a link member having three vertical protrusions 16 is show. This is only an example showing that it is possible to provide endless conveyors with one or more vertical protrusions. Normally, link members in a single endless conveyor carrying vertical protrusions would all carry the same number of vertical protrusions. It is, however, possible to include in a single endless conveyor, for example, link members carrying a single vertical protrusion and link members carrying, for example, three vertical protrusions. It is, however, required that guide rails are adapted to all types of links included in the endless conveyor. In FIG. 11, a guide rail 64 adapted to a link member having a single vertical protrusion is shown on the upper half of the figure, and a guide rail 64 adapted to a link member having a three vertical protrusions is shown on the lower half of the figure. The guide rails include a first and second rail member 66, 68 positioned on opposite sides of the side portions 46, 47 of the vertical protrusion so as to give adequate support to an object transported on the vertical protrusion. In the event more than one protrusion is provided, or a plurality of parallel conveyor paths are arranged, one or a set of intermediate guide rails 70 are provided, which intermediate guide rails extend in between the vertical protrusions 16. In FIG. 12, a set of link members 24a-24c that each carries a single vertical protrusion 16 are shown. A single conveyor chain may be provided with a set of each type in order to provide a conveyor chain suitable for use together with a guide rail of the type shown in the lower half of FIG. 11. An endless conveyor may be assembled from sets link members 24-24c as shown in FIG. 13a or alternatively together with link members not carrying vertical protrusions 24d separating the link members carrying vertical protrusions as shown FIG. 13b.

In FIG. 3, a storage section 80 according to the invention is shown. The storage section 80 includes a gate 82 preventing or limiting release of transported cylindrical objects 22 from the storage section 80, an endless conveyor 86 and guide rails 88 positioned on respective side of said endless conveyor, which guide rails extend in the vertical direction to allow support for more than one layer of cylindrical objects positioned on top of each other on said endless conveyor. The endless conveyor is driven by conventionally arranged drive means 90. The gate 82 is controlled by an actuator which may be electrically, pneumatically, hydraulically or otherwise controllable in a manner well known in the art. The storage section preferably extends in the horizontal plane, even if a slight angle with respect to the horizontal plane may be allowed. The endless conveyor 86 is provided with base surface 37 having a set of humps 92 or cut-outs 94 (FIG. 14) arranged to transfer a momentum in an upwards direction to a cylindrical object positioned in the storage section when said hump or cut-out is passing said cylindrical object facilitating the forming of a plurality of layers of cylindrical objects. The endless conveyor may include a set of link members 24e and/or 24f as shown in FIGS. 14 and 15. The link member shown in FIG. 14 has a cut out 94 extending in the width direction of the link member 24e. The link member shown in FIG. 15 has a hump or ridge extending on the essentially flat upper surface 37, across the link member 24f. The humps and cut-outs are provided with shapes giving adequate momentum transfer in the upwards direction when the cut out is passing a cylindrical object in the storage section. The necessary size of the hump or cut-out depends on the weight and size of the objects that are to be transported and of the velocity of the conveyor. At the entrance 81 of the storage section, a roof section 83 is provided which is positioned at a height H over the base surface 37 which corresponds to the diameter of the cylindrical objects 84. A little play may be accepted as long as the play has a smaller magnitude than the height of the humps 92. When a cylindrical object is positioned in the entrance below the roof section, the hump will force a cylindrical object into the storage section. In the event a queue of cylindrical objects is lined up from the gate 82 to the entrance, the incoming cylindrical object will press the cylindrical objects. Since the endless conveyor is provided with humps 92 or cut-outs the line of cylindrical objects will be positioned irregularly with respect to the horizontal plane, se object at location D. The irregularities will facilitate dislocation of cylindrical objects from a first row in contact with the conveyor to upper rows positioned on top of other cylindrical object. The roof section may be adjustable in height so as to be adapted to the size of the object to be stored in the storage section.

Figure 16:
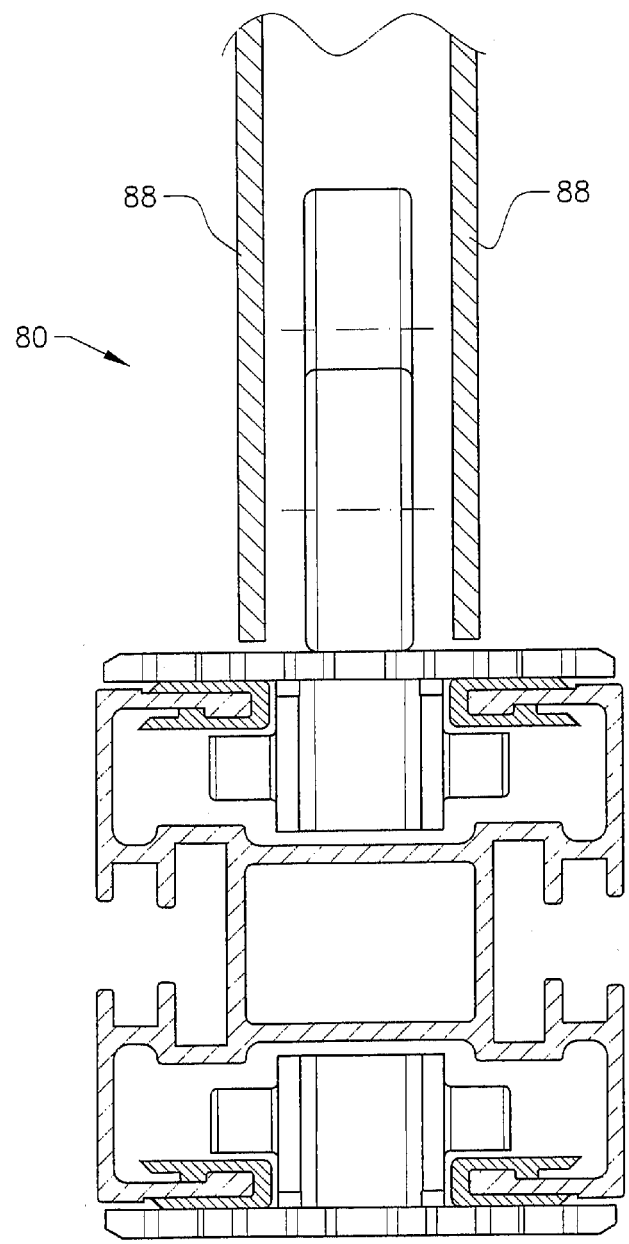
FIG. 16 shows a cross section through a storage section.
Figure 17:
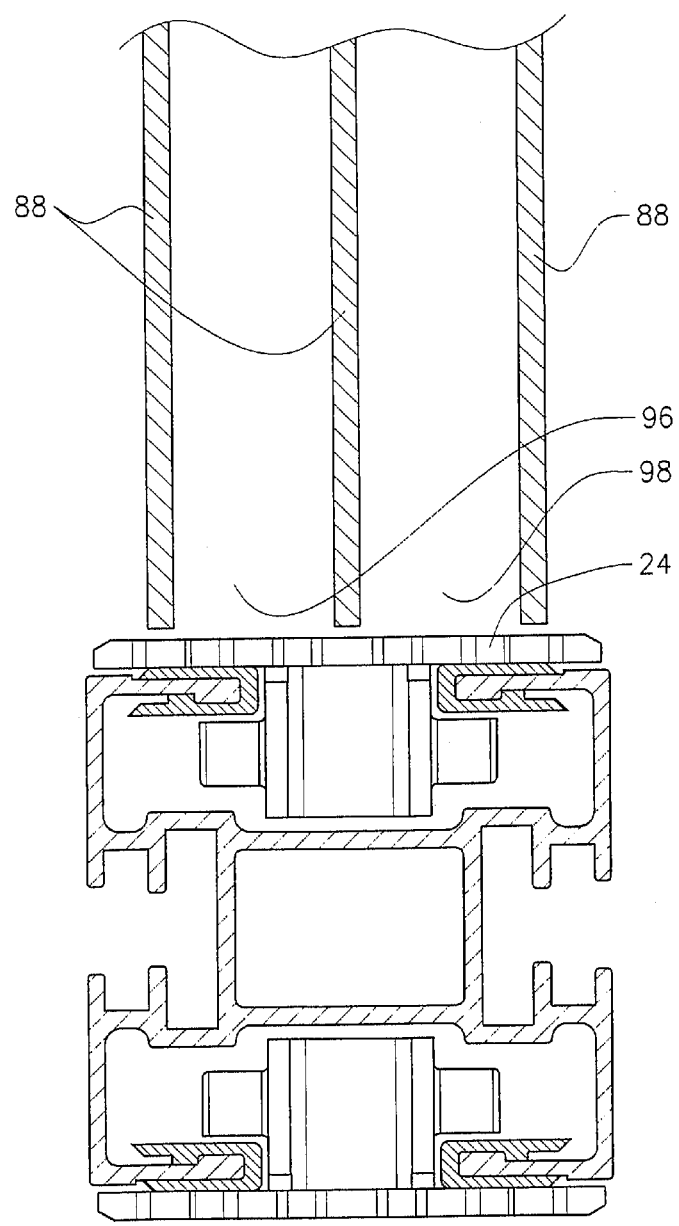
FIG. 17 shows a cross section through a storage section having a set of parallel conveyor paths extending through the storage section.

FIG. 16 shows a cross section through a storage section 80. It is here shown that guide rails 88 are arranged on respective side of the conveyor path. It is, as shown in FIG. 17, possible to arrange a set of parallel conveyor paths 96, 98 extending through the storage section. In this case, it is possible to allow parallel conveyor paths to share a common link member 24 having a width extending over a plurality or parallel conveyor paths. Guide rails are defining and separating the parallel conveyor paths. As seen from FIGS. 16 and 17, the guide rails extend to a height exceeding the double diameter of the articles to be transported.

For the purpose of giving adequate support, the guide rails are preferably constituted by flat walls extending in the height direction from the conveyor to a suitable height of two of more layers. Walls will be considered to be flat as long as they do not include notches, gaps projections or other uneven structures that may prevent the cylindrical objects from climbing on top of each other and/or to move in the transport direction. It is furthermore advantageous to arrange the walls such that the transported objects may be observed through the wall, as for example by arranging the walls by a small structured net, by a plate having small perforations arranged thereon or by a translucent or transparent glass or plastic wall.

Figure 4:
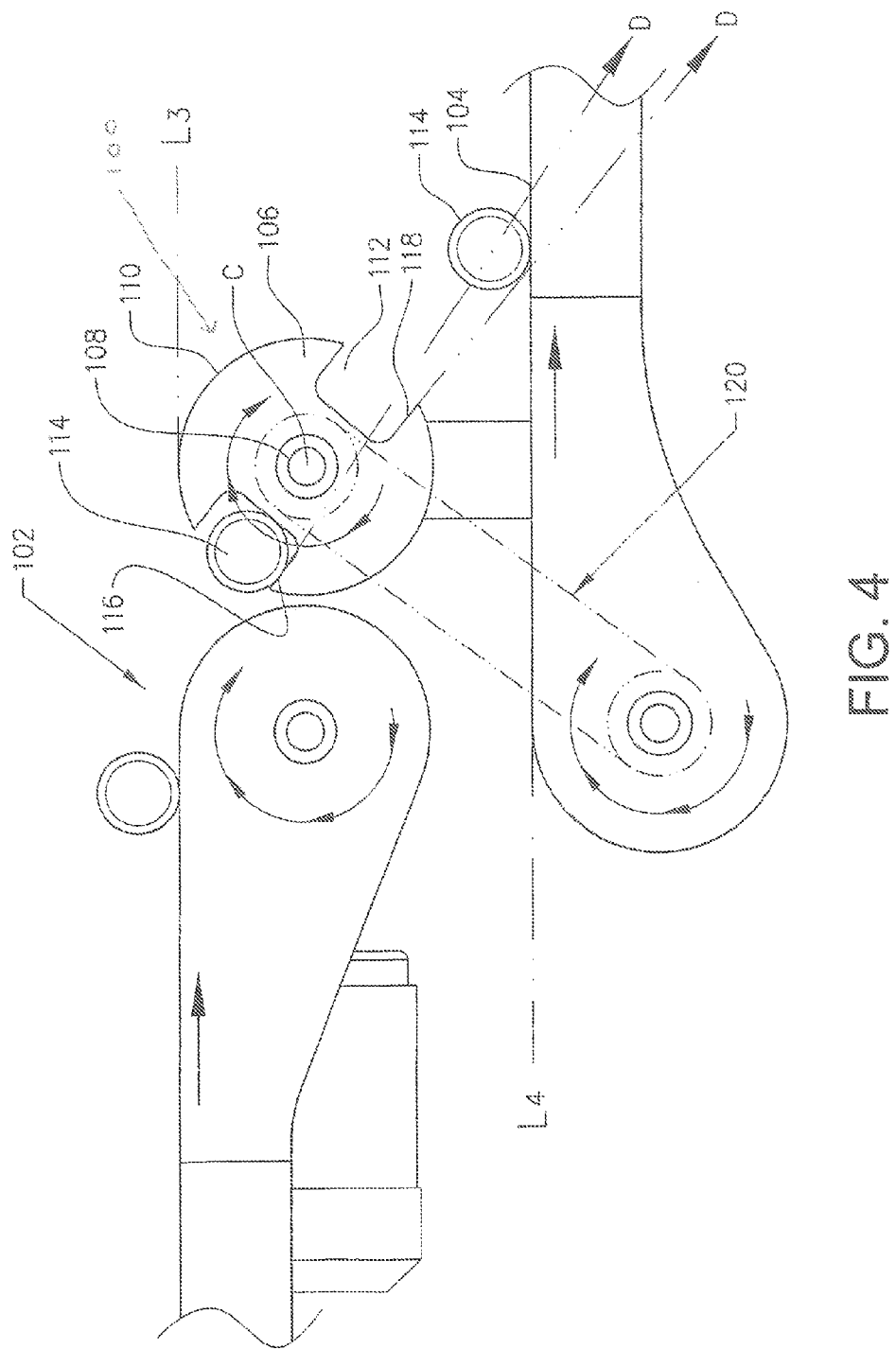
FIG. 4 shows a transfer section according to the invention.

In FIG. 4, a transfer section 100 arranged to transfer a cylindrical object from a first part 102 of said transport path to a second part 104 of a transport path is shown. The transfer section 100 is constituted by a disc 106 rotatably arranged around a horizontal axis 108. The disc 106 has a perimeter 110 which defines at least one gap 112 arranged to receive a cylindrical object 114 being transported on the first part 102 of the transport path when said gap is in a receiving position R and arranged to deliver a cylindrical object to said second part of the transport path after the disc is rotated to a delivery position D. The disc is show with the upper gap in the receiving position R and the lower gap in the delivery position D.

At the transfer section, the first part 102 is arranged at a level L3 which is above the level L4 at which the second part 104 is arranged, such that a lower edge portion 116 of the gap under an introductionary phase is inclined downwardly, as indicated with arrow I such that a cylindrical object 114 may roll toward the centre C of the disc and that a lower edge portion 118 of the gap, and that a former in the introduction phase upper edge portion 118 of the gap forms a lower edge portion under a disengagement phase, which lower edge portion 118 is inclined downwardly, as indicated with arrow D such that a cylindrical object may roll from the centre of the disc. The gap 112 may preferably be wedge shaped such that it is more narrow toward the centre C of the disc. In this event, the gap may give adequate support to transported cylindrical objects of different shapes. The rotating disc is provided with drive means 120 arranged to rotate the disc in the desired direction at adequate speed.

The transfer section may advantageously be used as a diverting module, which transfers objects transported on a single incoming conveyer path to two or more outgoing conveyor paths or a converging module which transfers objects from two or more incoming conveyor paths to a single outgoing conveyor path. FIGS. 4a-4f illustrates an embodiment where the transfer section forms part of a converging module.

Figure 4A:
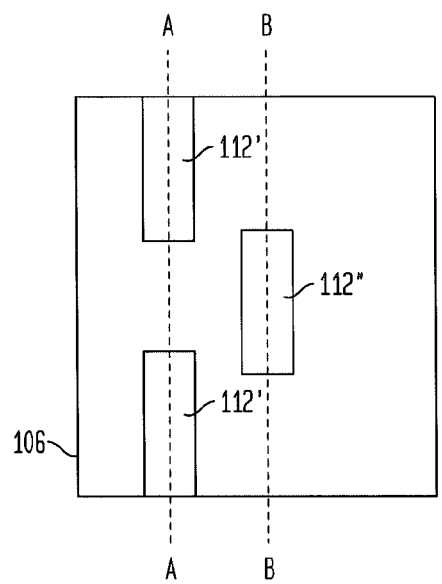
Figure 4B:
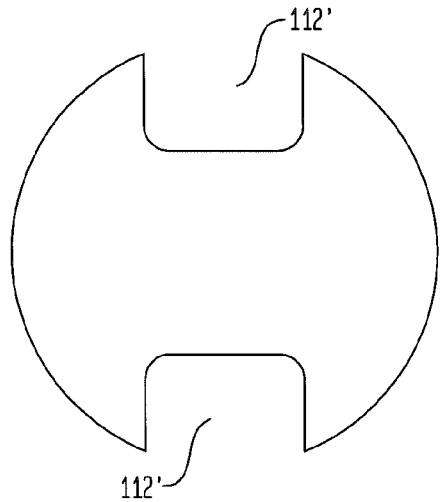
Figure 4C:
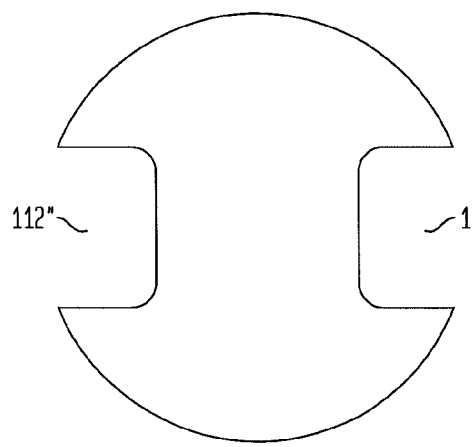
Figure 4D:
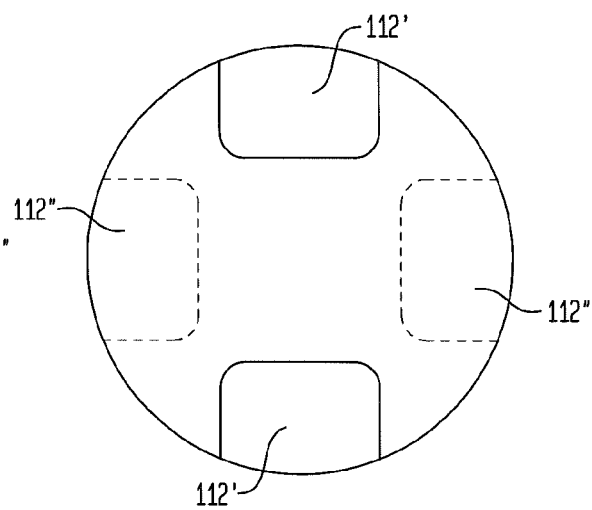
Figure 4F:
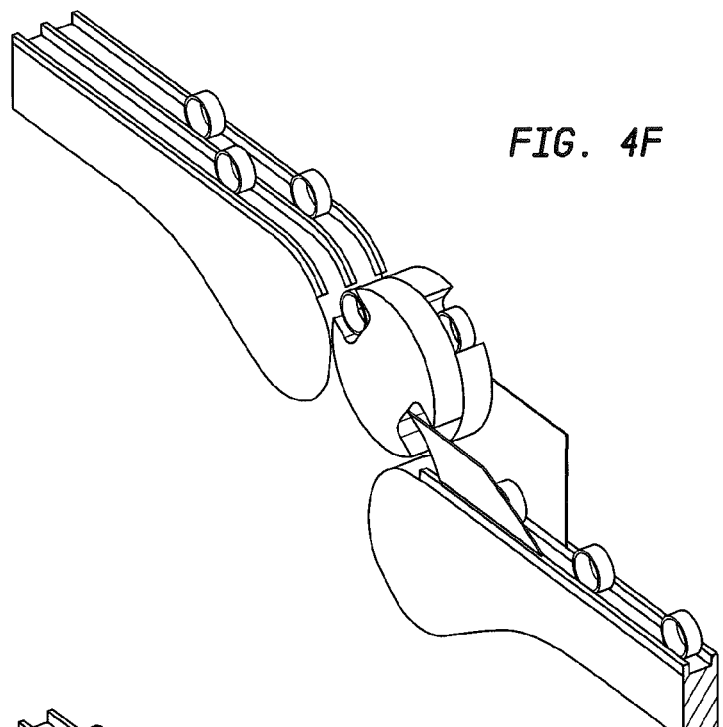

FIG. 4a shows a side view of a rotating disc 106 having two sets of gaps 112, a first set of gaps 112' being arranged to receive objects from a first conveyor 102' (FIG. 4f) and a second set of gaps 112" being arranged to receive objects from a second conveyor 102" (FIG. 4f). The second set of gaps is therefore axially displaced in relation to said first set of gaps such that only products transported on the first incoming conveyor 102' may enter the first set of gaps while only products transported at the second incoming conveyor 102" may enter said second set of gaps. FIG. 4b shows a cross sections at A-A of FIG. 4a. The first set of gaps 112' are visible. FIG. 4c shows a cross sections at B-B of FIG. 4a. The second set of gaps 112" are visible. FIG. 4d illustrates an end view of the rotating disc taken from cross section A-A in FIG. 4a. The first set of gaps 112' are visible and the second set of gaps 112" are indicated with a dashed line. In FIG. 4e, a front view of a converging module 144 is shown. A first and a second incoming conveyor 102', 102" leads to the rotating disc 106. Funnel means 150 are arranged to direct the cylindrical objects to a single outgoing conveyor 104. FIG. 4f shows a perspective view of the converging module shown in FIG. 4e.

Figure 4G:
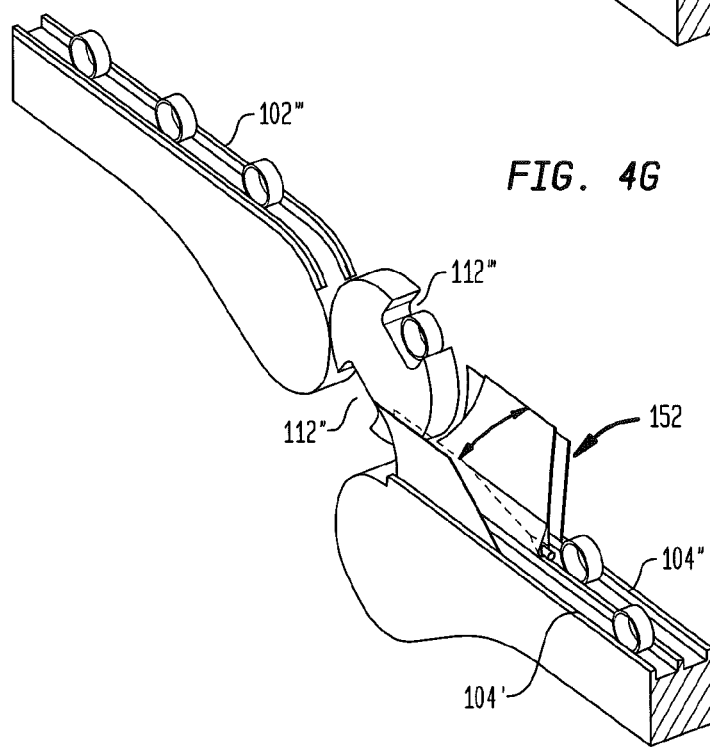
FIG. 4g shows an embodiment of a diverting module.

A diverting module is shown in FIG. 4g. The diverting module may be arranged in the same manner as the converging module shown in FIG. 4f, with the difference that a single set of gaps 112''' is arranged for a single incoming conveyor 102'''. A change over device 152, preferably arranged as a movably arranged chute which may assume at least a first position where it leads objects to a first outgoing conveyor 104' and a second position where it leads to a second outgoing conveyor 104".

Figure 18:
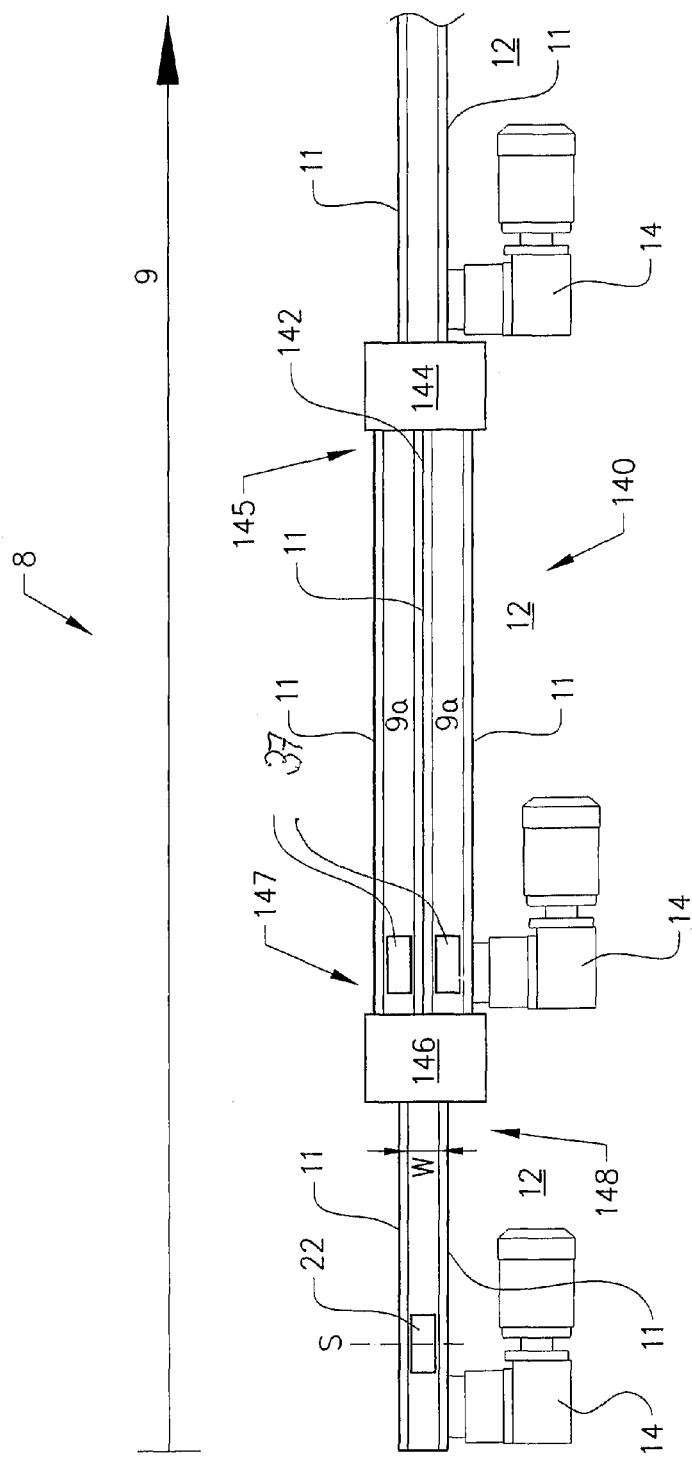
FIG. 18 shows a conveying system including a set of parallel paths.

As have been mentioned previously, the conveyor system may, at least along a portion of the conveyor path, include a plurality of parallel conveyer paths each being separated by guide rail portion, where said guide rails are arranged to give support to respective opposite end faces 22A of said cylindrical objects 22. In FIG. 18, a conveying system 8 is shown. The conveyor system 8 includes one or a plurality of conveyors 12 arranged in a transport path 9, drive means 14 arranged to feed the conveyors 12 and guide rails 11 arranged to restrict lateral movement of a cylindrical object 22 transported on said conveyor. The transport path may be linear such that it includes a beginning and an end and that cylindrical objects are transported between the beginning and the end. Such a conveyer includes a passive return path of the endless conveyor, at which passive return path cylindrical objects are not transported. Alternatively the transport path may be circular, which means that goods may be transported in a closed loop so as to return to a starting point and continue its movement along the transport path again.

A conveyor system according to the invention is adapted to admit transportation of said cylindrical object vertically positioned in relation to the endless conveyor such that a symmetry axis S of the cylindrical object extends in parallel with a width direction W of the conveyor 12. The adaptation may be constituted by specifically arranged guide rails supporting the cylindrical object in a vertical position on the conveyor. In preferred embodiments the conveyor system for this purpose includes one or more of an elevation transport section, a storage section and a transfer section as have been described above.

The transport system depicted in FIG. 18 is of the linear type and furthermore includes a set of parallel paths 140. Preferably the parallel paths shares a common guide rail 142 arranged in between two parallel conveyor paths. The parallel conveyor paths preferably also share a common conveyor, having link elements that extend over the plurality of conveyor parallel conveyor paths. In this case one or more guide rails separate the conveyor chain into a plurality of separate regions each arranged to transport goods in parallel with each other. In one embodiment a common conveyer link element 24 forms a common base surface 37 for a plurality of parallel conveyer paths 9, separated by guide rails 11.

A converging module 144 may be arranged at the end 145 of the plurality of parallel conveyor paths 140, which converging module 144 reduces the number or parallel conveyor paths by allowing entry from at least two parallel paths to a single path.

A diverting module 146 may be arranged at the beginning 147 of the plurality of parallel conveyor paths, which diverting module diverts 146 a set of entry conveyor paths 148 into said plurality of parallel 140 conveyor paths which includes an increased number of parallel conveyer paths in relation to the number of paths included in the set of entry conveyor paths.

The conveyor system as shown in FIG. 18 may include one or more elevation transport sections, one or more storage sections or one or more transfer sections in order to meet the demands of the conveyer system.

The invention claimed is:

1. A conveyor system for transporting cylindrical objects having a length and a diameter, wherein the ratio of said length to said diameter of said cylindrical objects ranges from ⅓ to ⅒, said conveyor system comprising an endless conveyor arranged in a transport path, a drive for feeding said endless conveyor, guide rails for restricting lateral movement of said cylindrical objects transported on said endless conveyor, said cylindrical object being defined by a cylindrical envelope surface and two opposite end faces, said conveyer system being adapted to actively transport said cylindrical objects in a vertical position, such that said cylindrical objects are transported by said endless conveyor on their cylindrical envelope surface, said guide rails being arranged to support respective opposite end faces of said cylindrical objects, such that the axis of symmetry of said cylindrical objects extends parallel to the width of said endless conveyor, an elevation transport section adapted to transport the cylindrical objects from a first height level to a second height level, said elevation transport section including said endless conveyer having a base surface extending along said transport path, said endless conveyor including a plurality of vertical protrusions extending outwardly from said base surface of said endless conveyer, said plurality of vertical protrusions including a front wall and a rear wall forming an upper inclined portion and a lower inclined portion whereby said cylindrical object transported on said elevation transport section can rest of said upper inclined portion when transported in an upward direction and can rest of said lower inclined portion when transported in a downward direction.

2. A conveyor system for transporting cylindrical objects having a length and a diameter, wherein the ratio of said length to said diameter of said cylindrical objects ranges from ⅓ to ⅒, said conveyor system comprising an endless conveyor arranged in a transport path, a drive for feeding said endless conveyor, guide rails for restricting lateral movement of said cylindrical objects transported on said endless conveyor, said cylindrical object being defined by a cylindrical envelope surface and two opposite end faces, said conveyer system being adapted to actively transport said cylindrical objects in a vertical position, such that said cylindrical objects are transported by said endless conveyor on their cylindrical envelope surface, said guide rails being arranged to support respective opposite end faces of said cylindrical objects, such that the axis of symmetry of said cylindrical objects extends parallel to the width of said endless conveyor, an elevation transport section adapted to transport the cylindrical objects from a first height level to a second height level, said elevation transport section including said endless conveyer having a base surface extending along said transport path, said endless conveyor including a plurality of vertical protrusions extending outwardly from said base surface of said endless conveyer, said plurality of vertical protrusions including a front wall forming an inclined portion sloping toward said base surface such that a cylindrical object transported on said elevation transport section can rest on said inclined portion under a contact force which is directed toward said base surface by gravity, and further including a plurality of parallel conveyor paths at least along a portion of the conveyor path and wherein said plurality of guide rails comprises a plurality of guide rail portions arranged along said conveyor path separating said plurality of parallel conveyor paths, said plurality of guide rails arranged to provide support for respective end faces of said cylindrical objects.

3. A conveyor system according to claim 2, including a converging module arranged at the end of said plurality of parallel conveyor paths, said converging module reducing the number of said parallel conveyer paths by allowing entry from at least two of said plurality of parallel conveyor paths to a single conveyor path.

4. A conveyor system according to claim 2 including a diverting module arranged at the beginning of said plurality of parallel conveyor paths, said diverting module diverting a set of entry conveyor paths into said plurality of parallel conveyor paths and including an increased number of said plurality of parallel conveyer paths in relation to the number of said plurality of parallel conveyor paths included in said set of entry conveyor paths.

5. A conveyor system according to claim 2 including two neighboring ones of said plurality of parallel conveyor paths in said set of parallel conveyor paths shares a common guide rail.

6. A conveyor system according to claim 2 including a common conveyer link element forming a common base surface for said plurality of parallel conveyor paths, said common base surface being divided into separate parts by said guide rails 1.

7. A conveyor system according to claim 6, wherein said plurality of parallel conveyor paths comprise at least a portion of said elevation transport section, said endless conveyor of said elevation transport section being provided with said plurality of sets of vertical protrusions disposed on said base surface of said endless conveyer, said plurality of vertical protrusions including an inclined portion sloping toward said base surface such that a cylindrical object transported on said elevation transport section can rest on said inclined portion under a contact force which is directed toward said base surface by gravity, wherein each of said plurality of parallel conveyor sections includes a set of said plurality of vertical protrusions disposed on a base surface common to all of said plurality of parallel conveyer paths.

8. A conveyor system according to claim 6, wherein said plurality of parallel conveyor paths comprises at least a portion of a storage section, said endless conveyor of said storage section being provided with a base surface having a plurality of irregularities selected from the group consisting of humps and cut-outs disposed to transfer momentum in an upwards direction to said cylindrical objects positioned in said storage section when said irregularity passes said cylindrical objects, in order to facilitate the formation of a plurality of layers of cylindrical objects, wherein said base surface is common to all of said plurality of parallel conveyer paths, said base surface having said irregularities distributed over all of said parallel conveyor paths.

* * * * *